July 11, 1967 W. J. MOUTON, JR 3,330,201
CONTINUOUS SPACE FRAME DOME
Filed May 14, 1965 5 Sheets-Sheet 1
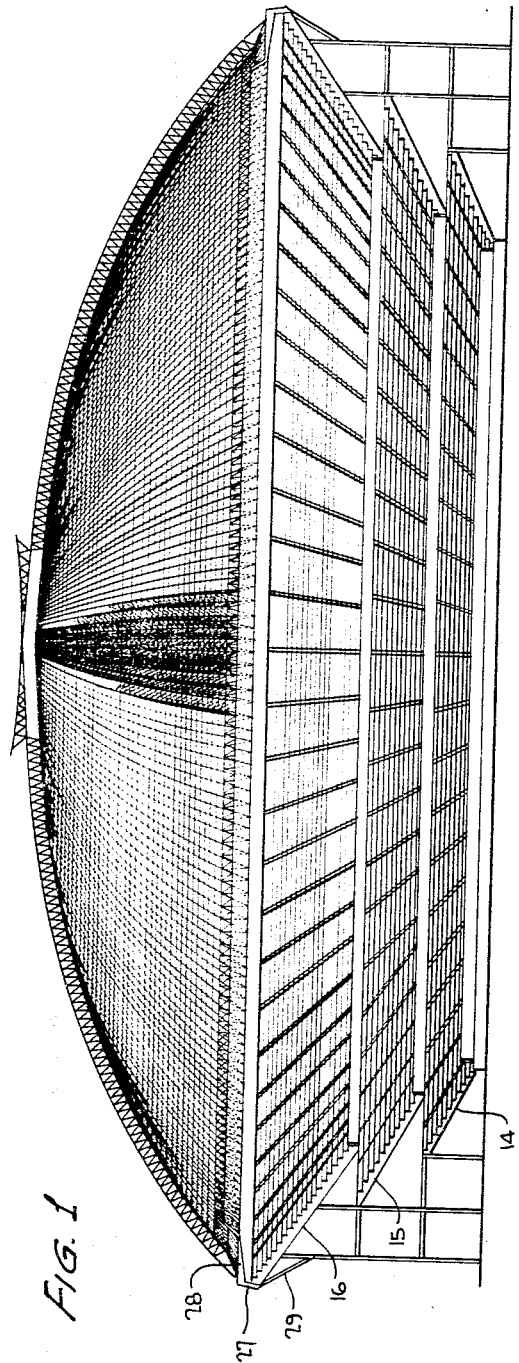
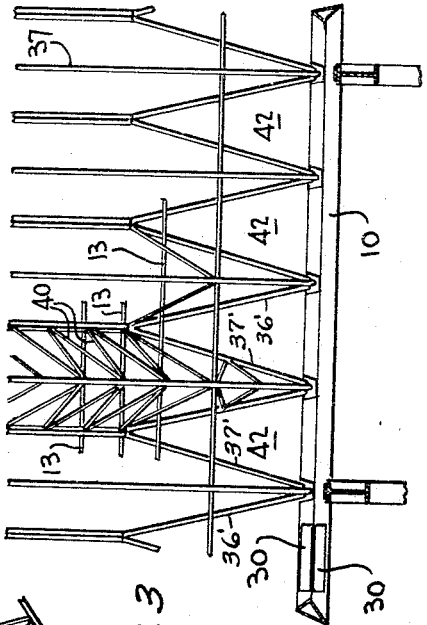
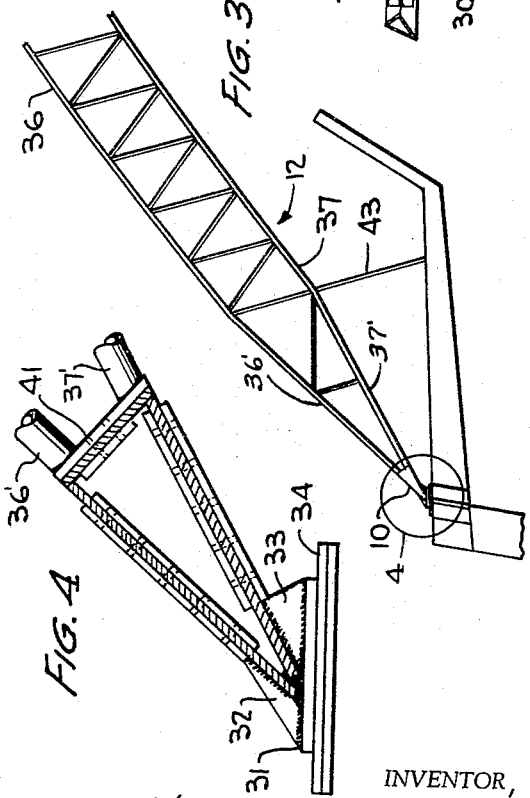
INVENTOR,
WILLIAM J. MOUTON, JR.
BY Watson, Cole, Grindle & Watson
ATTORNEYS

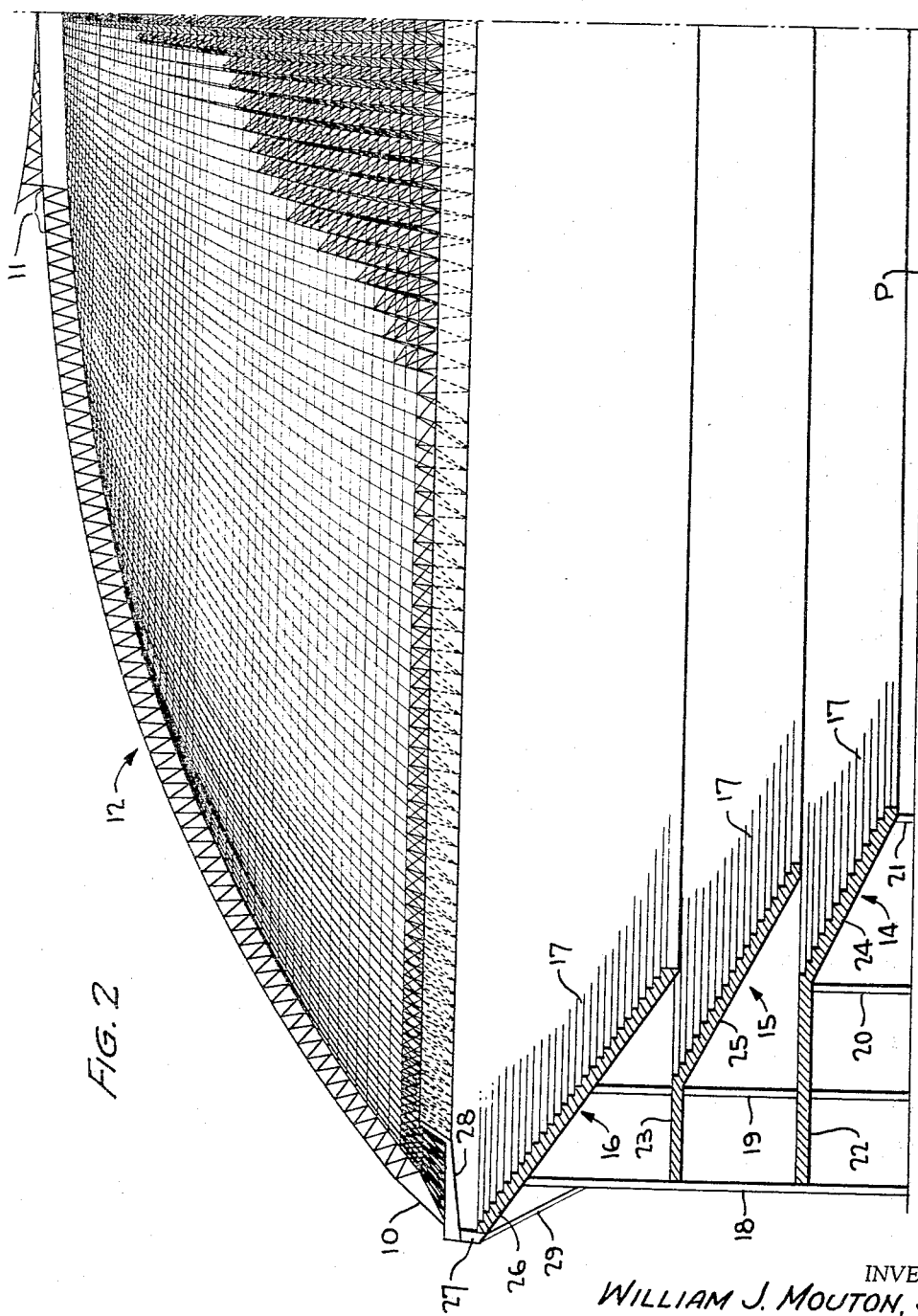

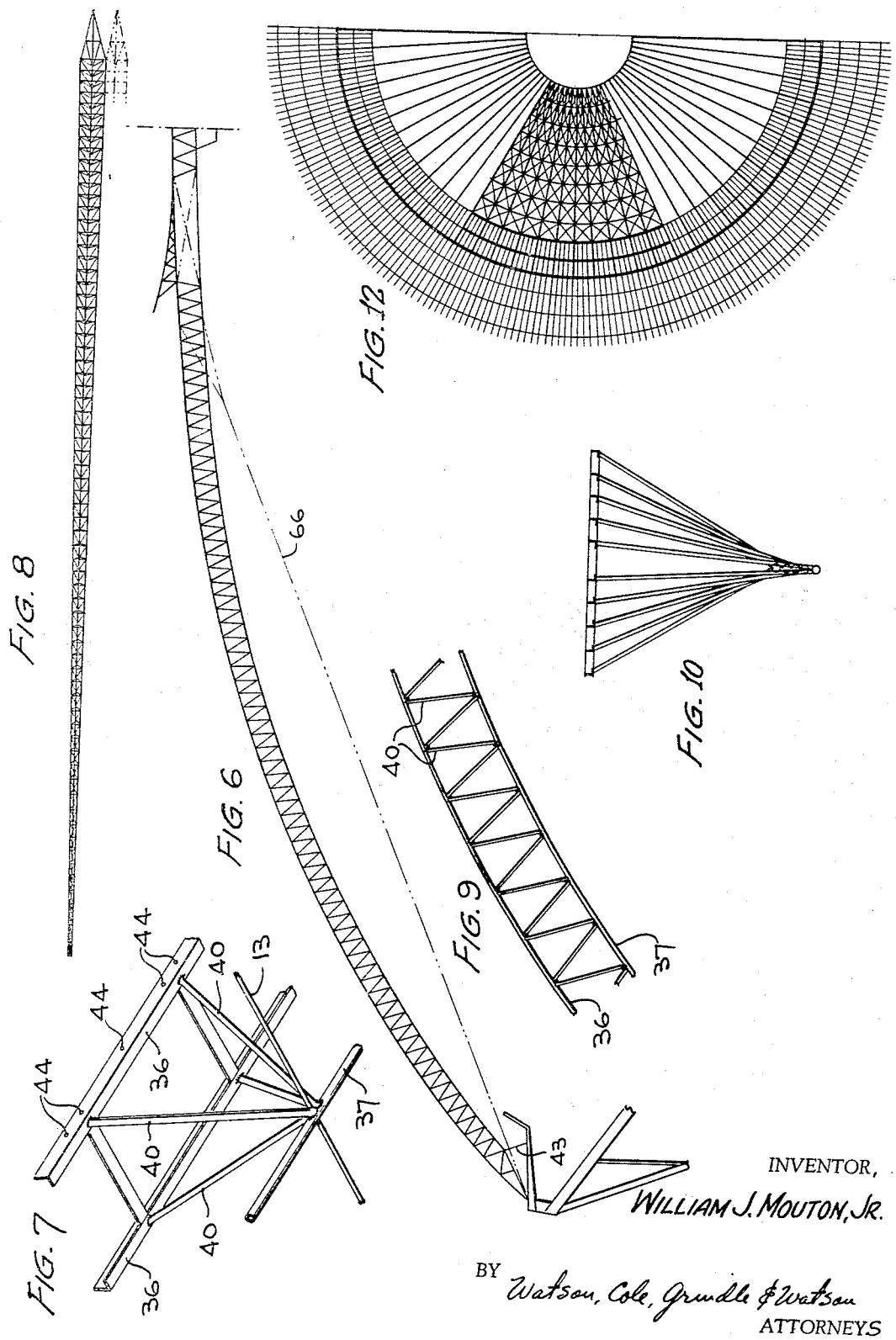

July 11, 1967  W. J. MOUTON, JR  3,330,201
CONTINUOUS SPACE FRAME DOME
Filed May 14, 1965  5 Sheets-Sheet 4

FORCE POLYGON AND
STRESS DIAGRAM

INVENTOR,
WILLIAM J. MOUTON, JR.

BY Watson, Cole, Grindle & Watson
ATTORNEYS

July 11, 1967  W. J. MOUTON, JR  3,330,201
CONTINUOUS SPACE FRAME DOME
Filed May 14, 1965  5 Sheets-Sheet 5
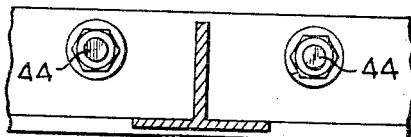
FIG. 14
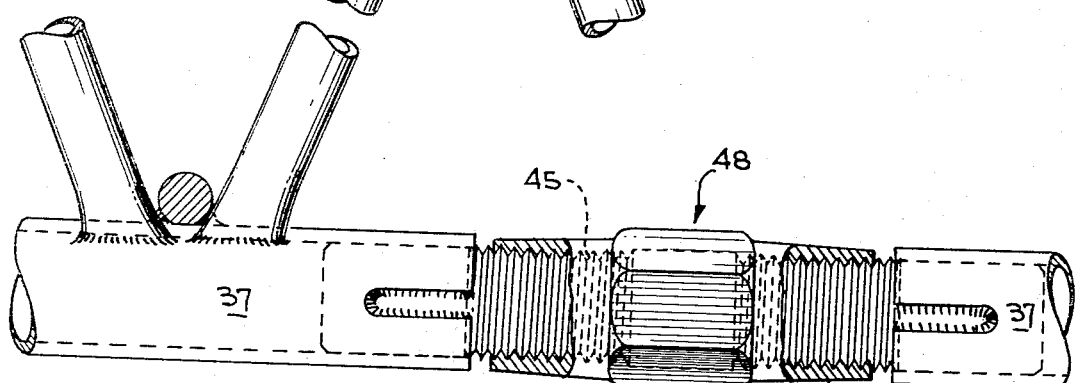
FIG. 13
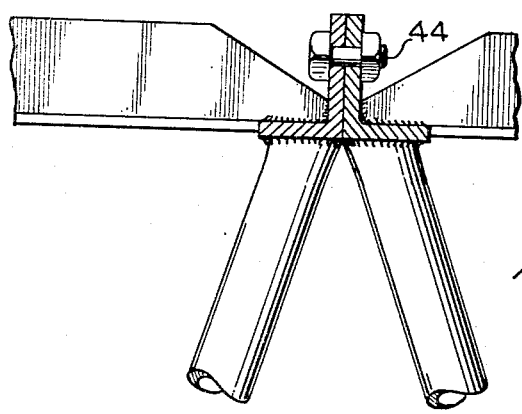
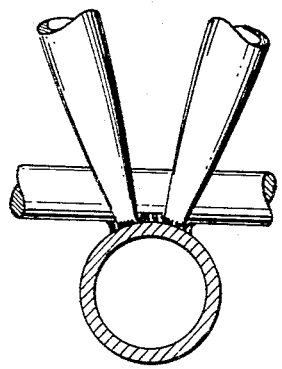
INVENTOR,
WILLIAM J. MOUTON, JR.
BY Watson, Cole, Grindle & Watson
ATTORNEYS 3,330,201
CONTINUOUS SPACE FRAME DOME
William J. Mouton, Jr., 1800 Jefferson,
New Orleans, La. 70121
Filed May 14, 1965, Ser. No. 455,896
20 Claims. (Cl. 98—32)

This invention relates to improvements in continuous space frame domes of the class which are adapted to provide weathertight and preferably transparent or translucent coverings over large areas such as ballparks, large auditoriums, exhibition areas, pedestrian malls, living patios, drive-in theatres, and the like.

Among the major objects of the invention are: to provide a simplified, economical, and readily erected space frame dome utilizing as its major constructural components a plurality of arched radial trusses extending between and connected to concentrically arranged tension and compression rings, with the radial trusses in mutually contiguous and mutually reinforcing and supporting relationship to define the major area of the dome; to provide a particularly economical and weight-saving construction of the individual trusses in accordance with which the top chords and top web members of the trusses, in addition to constituting structural components of the dome, also define frames for supporting sheets of weathertight and preferably transparent or translucent material such as glass or plastic to permit illumination of the interior of the dome by sunlight during normal daylight hours; to provide for an extremely simplified, novel, and efficient construction of the respective radial trusses in such manner that they may be formed in prefabricated sections at a prefabricating plant in convenient lengths for delivery by usual transportation means to the site of erection, to there be readily assembled into complete identical trusses of sufficiently light weight, even though in the order of hundreds of feet in length, as to permit their being individually hoisted into place for assembly in the dome structure by existing means.

It is a further object of the invention to form the various structural components of the dome of minimum cross-sectional size and weight, both for purposes of economy and also to permit the maximum portion of the dome area to be unobstructed by opaque structural members, whereby a maximum portion of the dome area will permit light transmittal therethrough from the exterior of the dome.

Other important objects are: to provide a space frame dome, the geometry and configuration of which permit the dome structure to closely approach in efficiency a convex suspended roof structure; and to promote ease of design of such structures by so constructing same as to substantially eliminate the imposition of bending moments and stress reversals on the radial trusses and truss components, leaving them subject only to substantially equal compressive forces whereby the trusses may be designed with regard only to uniform dead and vertical live loads.

Also, it is an object to provide such a dome structure in which, though designed only for uniform vertical dead and live loads, the mutually lateral bracing effect provided by laterally contiguous trusses; the increasing depth of the trusses toward the dome center; and the normally unstressed condition of the diagonal web members of the trusses, all contribute such a high degree of reserve strength to the structure as to render it readily capable of withstanding unusual loads such as may be caused by snow, high winds, hurricanes, and the like.

Further, in order to facilitate economy of construction, it is an object to so construct the dome that exactly equal compressive forces only are imposed on the chord members of the radial trusses and the amount of variation of these forces throughout the length of each chord member is so extremely small as to permit the formation of each chord or chord member of uniform cross-sectional size, weight, and shape throughout its length. To the same end, it is an object to so construct the dome that the diagonal web members of the respective trusses are normally substantially unstressed and may be of identical size, weight, and shape throughout substantially the entire length of each truss.

All of these objects are found to be obtainable by forming the dome in the shape of an inverted catenoid of the particular type required to withstand the calculated dead and vertical live loading of the complete dome, with each of its radial trusses thus having a corresponding catenary curvature. Such a structure will have a theoretical total load thrust line or funicular curve that passes through the center of gravity of the dome to produce the foregoing effects and advantages, when the dome is constructed with the tension and compression rings, radial trusses, and concentrically arranged tie rods in the manner more fully hereinafter described.

A continuous space frame dome in accordance with the present invention comprises inner and outer concentrically arranged structural rings generally referred to hereinafter as the tension and compression rings respectively, together with a plurality of arched and relatively contiguous radial trusses, each occupying a comparatively small angular portion of the annular gap between these rings and connected thereto at the radial extremities of their respective trusses. The top chords of adjoining trusses are interconnected along their lengths, whereby the interconnected trusses afford a continuous annular web between the inner and outer rings. The lower chords of the respective rings are rigidly interconnected by a series of concentrically arranged tie rods of sufficient strength to contribute materially to the load supporting capabilities of the dome structure. In addition to defining the upper surface of the dome, the top chords and top web members of the respective radial trusses also are arranged to define in each truss a plurality of frames for the reception of glass or plastic sheets, or if desired, other sheets of conventional and substantially rigid material.

By virtue of the specifically novel construction of the individual radial trusses in accordance with the preferred teaching of the invention, the aforesaid frames, with minor exceptions are of uniform radial extent and sufficiently approximately rectangular configurations as to greatly simplify their glazing by the use of rectangular sheets of material of uniform length.

A feature which contributes materially to the economy and ease of fabrication of the respective trusses, while at the same time resulting in a strong, efficient, and lightweight trust structure, consists in forming each truss with the cross-sectional configuration of an inverted isosceles triangle, with the two top chords interconnected by top web members extending perpendicularly between them, and with the bottom chord in a radial plane midway between the top chords and connected to the respective top chords by diagonally disposed braces or web members.

In view of the extreme length normally contemplated for the respective radial trusses, and the correspondingly large number of diagonal brace members or side web members required, it has been found possible to effect considerable savings, both in the fabrication and assembly of the said members by forming all of them of identical length. Moreover, by novel disposition of these members in each truss structure, it has been found possible to achieve a gradual increase in depth of each truss toward its inner end, together with an accompanying progressive decrease in its lateral width, as is necessitated by the angular relationship of its radially disposed top chords, while still securing uniform radial dimensions of the respective truss panels and glazing frames. In addition to gradually increasing the depth of ach truss toward its inner end, the respective side web members or diagonal braces gradually assume increasingly perpendicular positions toward the inner extremity of the truss whereby to contribute still further to the load-supporting capabilities and rigidity of the elevated central portion of the dome, thereby providing reserve strength for resisting unusual wind or unbalanced snow or ice loading conditions.

For facilitating the formation of the individual trusses to the desired anti-funicular curvatures, suitable means is provided for varying the lengths of their bottom chords, subsequent to complete assembly of each truss. By disposing the side web members or diagonal braces in accordance with the present inventive concept, the relatively opposing stresses of the oppositely inclined diagonal braces are caused to balance each other or, in other words, to zero out immediately after the first major panel point from the tension ring to thus achieve an optimum distribution of stresses.

Further, by virtue of the comparatively small cross-sectional sizes of the respective structural components, and their arrangement substantially throughout the dome structure in a regular pattern of uniformly angularly and radially spaced components, a dome in accordance with the invention is admirably adapted for use in covering a ballpark, stadium or the like. It affords ample visibility to permit players and spectators to visually follow a ball in flight against the background of the dome structure, as contrasted to the difficulties encountered in at least one existing dome, in which the large size and the irregular existing patterns and spacing between certain of the structural members it renders extremely difficult for players and spectators alike to visually follow a ball in flight.

The accompanying drawings together with the following detailed description are exemplary only but will serve to disclose what is presently contemplated as the best mode of practicing the invention. This will, of course, involve details which may be omitted or changed as those skilled in the art will readily understand, without departing from the inventive concept.

In the accompanying drawings:

FIGURE 1 is a diametrical vertical cross section through a space frame dome in accordance with the invention as utilized to form a dome-like cover for a sports stadium.

FIGURE 2 is an enlarged fragmentary view of the structure shown in FIGURE 1.

FIGURE 3 is a detail elevation of the outer end of one of the radial trusses showing how same is supported by means of the tension ring and stadium superstructure.

FIGURE 4 is an enlarged view of the portion of FIGURE 3 enclosed within the circle 4 in FIGURE 3.

FIGURE 5 is a partial interior elevation of the outer ends of the radial trusses and their associated supporting means.

FIGURE 6 is a somewhat enlarged radial section through the dome, showing in elevation details of the structure of one of the radial trusses.

FIGURE 7 is an enlarged fragmentary perspective view of a portion of one of the radial trusses as seen from the underside thereof, and including also a portion of one of its associated circular tie rods.

FIGURE 8 is an elevation of a single radial truss.

FIGURE 9 is an enlarged fragmentary elevation of a portion of one of the radial trusses.

FIGURE 10 is a composite sectional view in which radial cross sections of the truss, taken at the locations A to E of the truss respectively (as designated in FIGURE 6), are superimposed on each other to show the manner in which the truss is tapered from one end to the other.

FIGURE 12 is a half-plan view of the central portion of the dome including the compression ring and saucer cupola.

FIGURE 13 is a greatly enlarged fragmentary vertical section taken transversely through interconnected and relatively adjoining radial truss portion.

Figure 15:
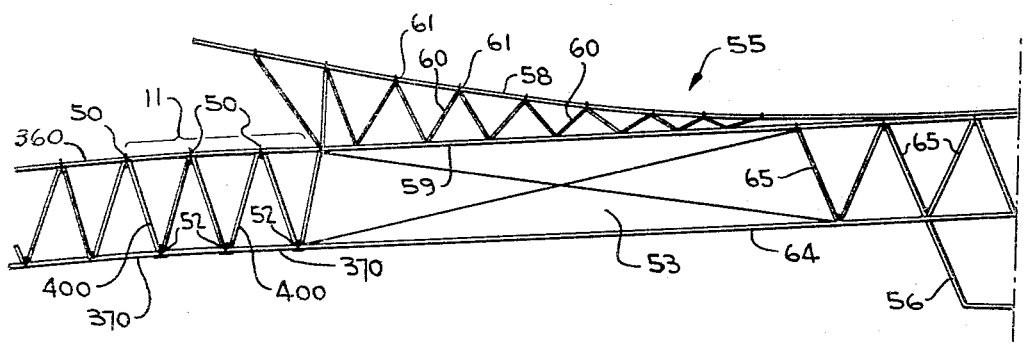

FIGURE 14 also is a fragmentary and greatly enlarged view, partly in elevation and partly in radial vertical section through one of the radial trusses, FIGURE 15 is a vertical diametrical section through the inner or central portion of the dome such as is illustrated in FIGURE 12.

Figure 16:
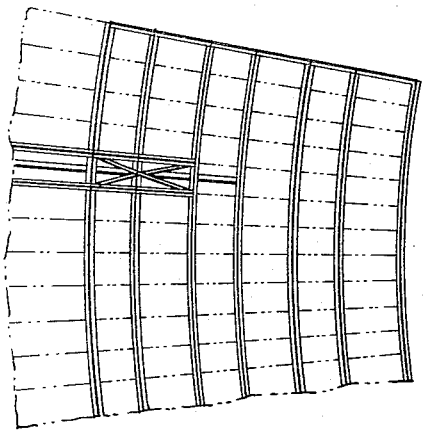
Figure 11:
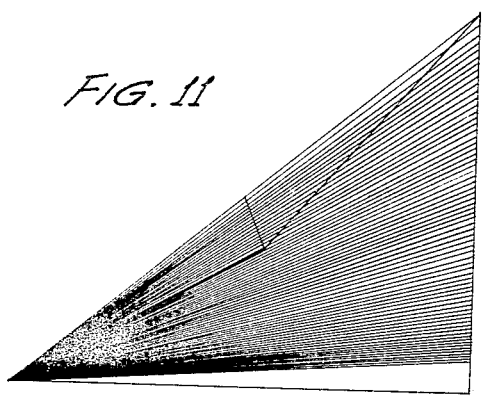
FIGURE 11 is a force polygon and stress diagram for one of the radial trusses.

FIGURE 16 is a plan-view of a portion of the pre-assembled compression ring and the adjoining inner ends of its associated radial trusses.

The dome proper of the invention basically comprises concentrically-arranged tension and compression rings generally designated 10 and 11 respectively, the annular space or gap between which is spanned and completely occupied by a multiplicity of radially disposed trusses 12 and a plurality of relatively concentric annular tie rods 13 interconnecting the respective trusses 12. Preferably the dome will be supported at its outer periphery through suitable supports cooperating with its tension ring 10 only, though it may also be adapted for support from its compression ring by means of a center tower cooperating with the tension ring support, thereby completely eliminating tension and compression ring stresses, as is done for erection.

The preferred embodiment to the invention has been specifically designed to function as a transparent weatherproof cover for use on a large stadium or arena of conventional existing type and of circular configuration and plan, as specifically exemplified by Shea Stadium in New York City.

The existing stadium (best seen in FIGURES 1 and 2) comprises several concentric vertically superposed annular platforms 14, 15, and 16 surrounding a centrally located playing field or arena P, each platform being properly provided with suitably arranged seats or benches 17 for spectators. These annular platforms are supported by a conventional rigid framework or superstructure comprising the vertical supports or columns 18 to 21 inclusive, the horizontal beams 22 and 23 and the diagonal or inclined beams 24, 25 and 26 constituting portions of the rigid framework of the respective annular platforms. The diagonal bears 24, 25 and 26 extend radially to the respective annular platforms and are located at suitable intervals around the platforms. It will similarly be understood that there will be a plurality of each of the upright columns 18 through 21, with each series of similarly designated columns disposed in relatively circumferentially-spaced circular formation concentric to the circular stadium. At the outer ends of the respective reinforcing radial girders 26 of the upper platform 14, there are affixed the upright structural members 27, from which are rigidly supported the inwardly directed cantilever beams or members 28 of suitable configuration for supporting an annular overhanging ledge or partial roof structure.

Such existing superstructure is preferably reinforced, as for instance by the diagonal reinforcing columns 29 interconnecting the upright columns 18 respectively to the radially outer ends of the diagonal beams 26 of the upper platform 16.

The outer peripheral edge portion of the dome, which is defined by the circular tension ring 10, is supported on the outer end portions of the cantilever beams 28 substantially over their upright supports 27, without need for further bracing means or columns within the stadium, such as might interfere with visibility and obstruct the playing field P. In other words, the dome herein disclosed is capable of completely spanning and supporting itself over an area of circular configuration of considerable diameter with the central portion of the dome at a substantial height. For instance, the embodiment of the dome here illustrated has been specifically designed to cover an area 745 feet in diameter and to be 268 feet high at its center.

As is shown in detail in FIGURES 3, 4, and 5, the tension ring 10 is in the form of a box girder of substantially inverted triangular cross section preferably comprising a plurality of girder lengths or sections interconnected at suitable intervals by splice plates 30 (FIGURE 5) to form a continuous annular unit. At locations over the respective cantilever beams 28, the tension ring 10 is provided with a downwardly directed horizontal bearing plate 31 welded or otherwise affixedly secured to the downwardly directed apex of the triangular girder configuration and preferably reinforced by stiffening webs such as 32 and 33 as in FIGURE 4. In accordance with usual practice, bearing pads 34 are interposed between each bearing plate 31 and the cooperative bearing surface defined by a bearing plate 35 affixed or defined by the upper face of each cantilever beam 28.

By such arrangement, provision is made for thermal expansion and contraction of the tension ring 10 and the dome in its entirely.

As was earlier indicated, the radial trusses, each generally designated 12, which collectively define the major portion of the dome, have their outer ends supported and confined by the tension ring 10, while their inner ends are connected to the concentrically located compression ring 11.

Each of the trusses 12 comprises a pair of relatively laterally or circumferentially spaced rigid top chords 36 extending in vertical radial planes, and a single bottom chord 37 disposed in a vertical plane midway between the top chords. From an area of maximum width or circumferential extent designated by the letter A in FIGURE 6 adjacent its radially outermost extremity, the top chords 36 of each truss converge radially inwardly toward the center of the dome in radial planes of the dome. The said top chords 36, 36 and the bottom chord 37 of each truss are all interconnected by suitable rigid top and side web members 38 and 40 respectively in such manner that the resulting truss is of inverted isosceles triangular configuration as illustrated in FIGURES 5, 7 and 10. Because of this configuration, the trusses are sometimes referred to hereinafter as "delta" trusses.

While the connections between the respective trusses 12 and the tension ring 10 may assume various forms within the scope of the invention, the preferred mode of connection consists in providing each truss with terminal supports or bearings affixed to inverted tripod structures or extensions acting as supports at its outer ends. Thus in the instant embodiment, there are spliced to the radially outer ends of the respective chords 36, 36 and 37 of each truss rigid extensions 36', 36' and 37' which, as shown in FIGURES 3 and 5, are made to converge outwardly from the maximum width outer end of the truss to a location substantially along the line of thrust or radial compression of each truss, as indicated by the broken line T in FIGURE 6. The converging ends of the extensions 36', 36' and 37' are fixedly connected, as by welding, to a mounting plate 41 which in turn is bolted to the inner periphery of the tension ring 10. The converging ends are thus disposed symmetrically to the line of thrust normally imposed on each truss, with the mounting plate 41 and the inner periphery of the tension ring 10 both disposed substantially normally to the line of thrust. The converging extensions 36', 36' are preferably interconnected by cross-braces which cooperate with them to define glazing frames for reception of glass or other transparent panels. These extensions are similarly connected to their associated bottom chord extension 37' by diagonal braces.

It is to be noted that the tripod extensions or bearing portions of the trusses 12 define between them a series of triangular ventilating openings 42 disposed around the base of the dome. The admission of air into these openings 42 may be controlled by a suitable louver structure 43 encircling the interior of the dome between the roofed-over cantilever beams 26 and the undersurfaces of the trusses, as indicated generally in FIGURE 6.

In accordance with important specific aspects of the invention, the various trusses 12 are identically proportioned and constructed so that their respective components are interchangeable, or in other words, so that each may be constructed of identical standardized components. In particular, the side braces or members 40 of the trusses are of uniform length to facilitate production and assembly of the respective trusses. This uniformity is employed to advantage both to achieve a uniformity in the radial dimensions of the respective truss panels and glazing frames and to achieve a gradually increasing vertical thickness or depth of the respective trusses toward their inner ends for increasing the load supporting capabilities of the midportion of the dome.

Thus, considering the structure of each individual truss in somewhat more detail, the top chords 36 of each truss are, of course, arched or curved in vertical planes in conformity with the desired curvature of the dome. It is an important feature of the present invention to form the dome as an inverted catenoid, and to this end to curve or arch the respective trusses in the form of catenary curves constituting cross sections of the catenoid dome structure. This together with the other structural features herein described permits achievement of the important advantage of being able to utilize in each of the top and bottom chords 36 and 37 structural members of uniform size and cross-sectional shape throughout the lengths of the chords. Also with this structure of the trusses, it is possible to achieve the desired end of having the line of thrust T in each truss located medially between the top and bottom chords of the truss. It is important, of course, that the thrust line T itself be located to lie on or coincide with a catenary curve in order to achieve the advantages of the invention.

These top chords 36 in the preferred embodiment respectively comprise steel angle members having their lateral flanges directed toward each other. The top web members 38, which extend laterally or circumferentially between and interconnect respective top chords 36, 36, preferably comprise rigid steel structural members of inverted T cross section extending perpendicularly between their respective top chords 36 and welded thereto, with the lateral web of each T member in a common plane with the lateral web of its associated angle members 36, so that the sheets of transparent material may be supported on such lateral webs in each glazing frame.

Preferably the cross bars 38 of each truss are uniformly radially spaced from the inner extremity thereof to the maximum width outer end thereof.

With such arrangement, the glazing frames defined by each pair of top chords 36, 36, together with its cross bars 38, will be of uniform radial dimensions, even though of progressively decreasing width or circumferential dimension. Moreover, the maximum width, or angular extent of each truss, and thus the angular relationship between its top chords is comparatively small, consisting for instance of 1¼ degrees in the embodiment here chosen for illustration. Due to this small angle, it will be readily apparent that the respective glazing frames will readily accommodate rectangular sheets of glass or other sheet material preferably of a transparent or translucent nature, or else of opaque nature should this be desired. This ability to utilize rectangular sheets in the glazing frames further contributes to the ease of production and assembly of the structure.

The aforesaid sheets or panels may be secured in the glazing frames by suitable glazing compound in conventional weatherproof manner.

The side web members or brace members 40 of the preferred embodiment comprise identical lengths of rigid commercially available pipes, arranged in alternately oppositely inclined or diagonal relation between each of the upper or top chords 36 and the bottom chord 37 with the relatively converging upper ends of each said pair of adjacent braces 40 welded or otherwise fixedly secured to the top chords, at the panel joints designated by and coincident with the respective cross bars 38. Thus, from the four corners of each of the substantially rectangular glazing frames (as illustrated in FIGURE 7) four diagonal braces 40 mutually converge downwardly and are welded to the bottom cord 37 at a substantially common area or location medially of each panel.

In other words, the said bracing members converge downwardly in pairs from each top cord 38, with laterally opposed such pairs converging relatively inwardly toward each other for connection to the bottom chord 37 midway between each pair of relatively adjoining cross bars 38, 38.

These converging pairs of brace members 40, 40 extending from the respective top chords 36 of each truss 12 are disposed in circumferential registry to define a plurality of concentric annular series of such downwardly converging pairs of brace members 40, 40 completely around the dome. The relatively concentric circular tie rods 13, which interconnect the respective bottom truss chords 37, are accurately disposed and positioned between the converging ends of each such pair of oppositely inclined braces 40. The circumferential or circular tie rods 13 may advantageously comprise continuous rigid steel rods supported across the respective radially disposed bottom cords 37, between pairs of downwardly converging brace members 40, 40 and welded or otherwise fixedly secured to the respective bottom chords as shown at 45 in FIGURES 14 and 15.

It will be apparent from FIGURES 9 and 10 that the bracing members 40 between each top chord 36 and the lower chord 37 or its respective truss are of constant length and attached to the upper chords 36 at uniformly spaced locations coincident with the spacing of the respective cross bars 38, and in addition, the angular relationship between each pair of relatively upwardly diverging brace members 40 of each top chord will remain substantially uniform. However, by recourse to FIGURE 10, it will become apparent that as the relatively spaced top chords 36 of each truss converge toward its radially inner end, the angles between the circumferentially opposed or registering brace members 40 respectively on opposite sides of each truss will decrease accordingly as the planes of the respective members will assume near vertical positions. Accordingly, the lower chord 37 of each truss will be caused to diverge progressively away from the respective upper chords 36 to afford a maximum vertical dimension or depth for each of the trusses at its inner ends. It is to be noted that the top cords 36, 36 of each truss will be in contiguous abutting relation throughout their entire lengths with the relatively adjacent top chord 36, 36 of the trusses on either side thereof. Such relatively contiguous chords are interconnected at suitable intervals along their length to provide a circumferentially continuous truss structure. In the instant embodiment, utilizing angle irons as the top chords 36, each pair of relatively abutting and contiguous vertical flanges is interconnected by means of bolts 44, disposed at suitable intervals throughout their respective lengths, as in FIGURES 13 and 14.

Where the trusses are of considerable length, for instance of the order of several hundred feet, it will frequently be found desirable to fabricate each truss in a plurality of sections for delivery to the construction site, to there be assembled into a complete truss prior to incorporation in the dome structure. Thus, for instance, referring to FIGURE 6 of the drawings, each truss may for instance be comprised of a plurality of separately fabricated sections respectively extending from A to B, B to C, C to D, and D to E. The several sections of each truss may be then interconnected, preferably in a suitable jig by bolting together or splicing their respective portions of the top chords 36 and by coupling together or otherwise interconnecting their respective portions of the bottom chord 37.

In order to provide accurate formation to the desired curvature of each completely assembled truss, it has been found desirable to provide means for varying the length of the lower chord 37 while maintaining the upper chords 36 of each truss of constant length. A suitable such means is exemplified by the structure shown in FIGURE 17 wherein the separately formed sections of the lower chord 37, in the form of hollow pipes or tubing, are provided at their adjoining ends with oppositely threaded plugs 45 and 46 which are welded in place in the relatively opposed ends of the respective tubular chord sections to project outwardly therefrom. In combination with these, there is provided a sleeve nut 47 having oppositely internally threaded portions respectively operatively receiving the externally threaded plugs 46 and 47. There is thus defined a turnbuckle structure, generally designated 48. Thus rotation of the sleeve nuts 47 may be utilized to elongate or shorten the lower chord 37 as desired in order to adjust the curvature of each truss. Manifestly the turnbuckles 48 will be uniformly located in the respective trusses 12, preferably in the positions B, C, and D, as designated in FIGURE 6, of each truss.

The compression ring 11 at the radially inner extremities of the respective trusses 12 is adapted for complete fabrication as an independent unit for positioning at the desired height above and concentrically to the tension ring 10, so that the trusses 12 may be then individually and successively hoisted into relatively adjoining radially extending positions between the said rings and secured to them and to each other to form a dome structure in which they completely span and occupy the annular gap between these rings.

In the preferred embodiment of the invention, the construction of the inner or compression ring is generally similar in appearance and structural pattern to the assembled trusses 12, to the end that it will appear to constitute a radially inward continuation of the respective struts and will follow the same general pattern and disposition of structural members as the surrounding dome structure, without introducing striking differences, irregularities in pattern, or the inclusion of extremely large or heavy structural members, which could tend to distract both players and spectators so as to interfere with their ability to visually follow the flight of a ball.

Though the compression ring is thus constructed generally in the same pattern and to have generally the same appearance as the interconnected struts of the dome, it is especially strengthened to withstand the very substantial radial compressive forces normally exerted on it by the inner radial ends of the trusses, and in the preferred embodiment comprises a plurality of concentric interconnected circular trusses.

Thus in the illustrative embodiment here shown best in FIGURES 15 and 16 of the drawings, the compression ring 11 comprises upper and lower series of rigid rings 50 forming the top chords of the trusses, and 52 respectively providing the bottom chords. The rings of both series may advantageously be of similar construction comprising in each ring, a pair of angle members with their vertical flanges secured in back-to-back relationship, the resulting composite T cross-section member being fabricated into the form of a continuous circle in which the cross-sectional size of the respective rings 50 and 52 will be ample to provide the necessary resistance to radial compression. The several upper rings 50 are disposed concentrically to the rest of the dome structure and to each other and are interconnected by inverted T section members 360 aligned with the respective top chords 36, to coact with the rings 50 in defining glazing frames having similar radial dimension to these of the radial trusses 12. The lower series of rings 52 is similarly formed and concentrically disposed in staggered relation respectively to the upper series 50 with the spacing between the lower rings also being similar to the radial dimensions of the respective truss panels and glazing frames.

The respective lower rings 52 are interconnected by short sections of pipe 370 extending between and welded or otherwise firmly connected to the respective rings 52. The spacing between relatively adjoining pipe sections 370 will be similar to the uniform circumferential spacing between adjoining lower chords 37 of the trusses in the dome structure so that the pipes 53 and lower chords 37 respectively may be positioned in alignment and the pipe sections 370 may in effect constitute radially inward extensions of the lower chords 37.

The upper and lower series of rings 50 and 52 are rigidly interconnected by alternately diagonally disposed braces 400 in a concentric triangular truss configuration in which the braces are preferably of the same uniform length as the brace members 40 of the respective trusses. These braces 400 may be arranged in the same manner and pattern as the truss braces or members 40, though they will be formed of heavier and stronger material than the braces 40 to better withstand the stresses imposed upon them.

Manifestly as the various upper and lower chords 36 and 37 of the respective struts 12 and their corresponding extensions 360 and 370 in the compression ring, converge inwardly toward the center or central vertical axis of the dome, they occupy an increasing proportion of the dome area; and because of their opaqueness, detract from the light permeable area of the dome.

In order to minimize the effect of this, it has been found desirable to form the compression ring 11 of annular shape of comparatively large diameter to define a large central opening 53 through the dome which, as shown in FIGURE 15, is adapted to provide a comparatively large unobstructed light-transmitting and ventilating central area to admit sunlight in such quantity and concentration as to effectively offset the reduction in light transmittal caused by the converging structural members within and adjacent the compression ring 11.

The central opening 53 thus provided may be covered by a preferably transparent saucer-shaped cupola 55 which need have only sufficient strength to support itself across the opening and which may, if desired, include a centrally located gondola 56 to accommodate television cameras, reporters, broadcasting equipment, and the like.

A saucer cupola suitable for this purpose is illustrated in some detail in FIGURE 15, from which it will be seen that the cupola comprises a series of centrally converging radial triangular trusses comprised of struts 57 constructed in generally similar manner to the respective struts 12 of the dome proper with the upper and lower chords 58 and 59 respectively of the struts interconnected by the diagonal cross braces 60. The relatively adjoining radial chords 58 are connected in contiguous manner to each other, and the top chords 58 of each such strut are interconnected by uniformly spaced cross pieces 61 to define glazing frames for reception of sheets of transparent material such as glass or transparent plastic adapted to permit free entry of sunlight through the central opening 56. The upper chords 58 and the sheets of glass or other roofing or covering material supported therein are spaced above the upper surface of the dome and project somewhat radially outwardly beyond the periphery of the opening 53, the cupola 55 being supported over the opening by means of its lower chords 59, which are welded or otherwise fixedly connected to the innermost ring of the upper series of rings 50 of the compression ring structure. The vertical space between the glass supporting upper chords 58 of the cupola and the similarly glazed upper surface of the dome proper affords a radially outwardly directed ventilating opening which will preferably be controlled by means of conventional adjustable louvers 62.

To minimize the interference with the light transmission through the glazed cupola and into the central portion of the dome, the various structural members of the cupola, such as the upper and lower chords 58 and 59, the diagonal braces or brace members 60, and the cross bars 61, as well as the tie rods 370 interconnecting the respective bottom chords 59, may all be of reduced dimensions and light weight as compared to their corresponding components in the dome proper. The same is true as to the structural members defining the centrally located gondola 56 and its supports.

In the embodiment here shown, the gondola 56 is supported from a suitable plurality of radial ribs or members 64, the outer ends of which are connected to the bottom chord 52 of the innermost ring truss. These members 64 in turn are connected by the diagonal braces 65 to the bottom trusses 59 of the cupola 57.

In order to minimize interference both with the transmission of light through the cupola 57 and the upward flow of air to and through the ventilating louvers 62, the diagonal brace members 64 are utilized only at the central portion of the cupola 57; and in view of the comparatively light weight of the gondola structure 58, the function of these braces 64 may normally be adequately served by the diagonally disposed tension cables 65 and 66 disposed at suitable angular intervals of about five degrees around the cupola.

*Mode of assembly*

In the construction of a dome in accordance with the invention, the manner of erecting same over a stadium such as is shown in FIGURES 1 and 2, to provide a transparent weatherproof covering therefore is believed to be readily apparent, as is the fact that the domes of the invention are adapted equally well for application to other types of structures. Thus in the assembling and erecting of a dome such as specifically illustrated herein, the tension and compression rings 10 and 11 will first be positioned in concentric relation. The tension ring 10 will be supported on the cantilever members 26 by means of the bearing structures 30, 35 as heretofore described. The compression ring 11, with or without its cupola 55, after having been completely pre-assembled as a unit, is supported by means of a temporary tower or scaffolding (not shown) erected at the center of the circular arena or playing field for this purpose. The individual trusses 12 where they are of extreme length such as here contemplated will usually have been formed at the production plant in pre-assembled sections of sufficient size as to facilitate their transport to the construction site. There they are assembled as units, preferably by the use of a suitable jig located at the site. As earlier noted, the inter-positioning in the bottom chords 37 of the respective trusses, of the turnbuckles 48, provides a means whereby through appropriate adjusting of the said turnbuckles the completely assembled radial trusses 12 may be adjusted accurately to the desired uniform curvature.

Because of the purposely light construction of the individual trusses and their structural components, the respective trusses when first lifted into position and supported solely by the connections of their opposite radial extremities with the tension and compression rings respectively may be sufficiently flexible as to tend to sag in the middle due to their own weight. In order to counteract this sagging tendency, it may be found desirable to interconnect tension cables between the opposite radial extremities of the respective trusses 12 as indicated by the numeral 66 in FIGURE 6. The tensioned cables 66 thus function in the manner of bow strings to maintain the curvature of the trusses until such time as they are suitably interconnected with and supported by adjoining trusses in the dome structure. The respective cables 66 may then be removed.

It will be apparent that with the pre-assembled compression ring 11, supported at the desired elevation within the stadium and concentrically to the tension ring 10, the individual radial trusses 12 may be successively raised into operative assembled relation, with the radially outward extremity of each truss having its connecting plate or mounting plate 41 bolted to the tension ring 10. The inner end of the truss similarly will be accurately positioned with its upper and lower chords 36 and 37 in endwise registry or alignment with the appropriate radial members 360 and 370 respectively of the compression ring. The inner ends of the trusses will then be bolted or otherwise fixedly secured to the compression ring.

The trusses 12 are thus successively raised to position and interconnected between the tension and compression rings respectively until the entire annular gap between these rings 10 and 11 is completely occupied by the trusses. The angular extent of each truss is such that a given number of the trusses will completely occupy the entire circumference of this annular space, with the radially extending top chords 36 of adjoining trusses in snug contiguous relation. The top chords 12 of all of the trusses will then be bolted together in the manner earlier described, and the lower chords 37 thereof will be rigidly interconnected by the concentrically arranged tie rods 13.

Upon completion of the assembly, the temporary supporting tower or scaffolding for the tension ring will be disassembled and removed from the stadium whereby the completed structure will comprise a transparent dome completely covering the entire stadium and unsupported except at its periphery.

By utilizing the construction here disclosed, it is made feasible to employ an exceedingly lightweight structure capable of formation from conventional commercially available structural members. Because of the double functioning of the radial trusses both as structural components of the dome and also as glazing frames, the over-all weight and expense of the structure are both maintained at a minimum. The use of such extremely lightweight and individually flexible trusses is made feasible by their arrangement and interconnection so as to afford mutual bracing and reinforcement for each other in their assembled relation.

Moreover, in the individual radial trusses as disclosed herein, the use of the side web members or brace members 40 of uniform length throughout the main portions of the trusses, excluding their lower end supports, promotes ease and economy of production. In addition, these members are employed in a novel manner to achieve multiple advantages including the gradual increase in the depth of each truss toward its inner end with an accompanying decrease in lateral width, while at the same time permitting the maintenance of uniform radial dimensions of the respective panels and glazing frames.

Attention is directed to the fact that the drawings accompanying and forming part of the present application are reproductions of actual scale drawings from which a space frame dome is to be erected. Therefore, the said drawings constitute accurate disclosures of the relative dimensions, angles, shapes, and other features of the preferred embodiment. Notwithstanding this, however, let it be realized that various features, details, and elements may be changed or eliminated without departing from the invention as defined in the accompanying claims.

Having thus described my invention, I claim:

1. A space frame dome comprising relatively concentric radially spaced tension and compression rings, a plurality of radially extending arched trusses having their outer ends supported and radially confined by said tension ring and their inner ends connected to and in radial abutment with said compression ring, each said truss comprising a pair of relatively inwardly converging interconnected top chords extending radially to the said dome, a bottom chord disposed in a radial plane of the dome bisecting the angle between said top chords, and web members connecting said bottom chord to each of said top chords, said top chords of each truss being contiguous with and interconnected to the top chords of relatively adjoining trusses, and a series of circumferentially extending radially spaced tie bars interconnecting the respective bottom chords of all said trusses.

2. A space frame dome as defined in claim 1 wherein the respective radial trusses include radial extensions forming supports at their outer ends, said supports being respectively connected to the tension ring.

3. A space frame dome as defined in claim 1 in which each said truss comprises a plurality of radially aligned panel sections of uniform radial extent, cross bars extending between and rigidly interconnecting the top chords of each said truss at the respective panel joints and cooperating with said top chords to define a plurality radially aligned glazing frames, said web members being connected to said top chords at said panel joints.

4. A space frame dome as defined in claim 3 in which said web members extending between and interconnecting each said top chord and its associated bottom chord comprise a plurality of rigid brace members of uniform length extending alternately in opposite diagonal directions throughout the length of the truss.

5. A space frame dome as defined in claim 3 in which said diagonal brace members interconnect the respective top chords to the bottom chord in uniformly spaced relation to the bottom chord, the inward convergence of the said top chords causing said brace members to assume increasingly upright positions toward the inner ends of the trusses, bottom chord being caused thereby to diverge downwardly away from the respective cross bars to accommodate the correspondingly increased vertical component of the said diagonal members.

6. A space frame dome as defined in claim 1 in which said compression ring comprises a plurality of annular trusses, each of triangular cross section in a radial plane, said trusses being concentrically arranged with respect to each other and each including a pair of relatively radially spaced annular top chords, an annular bottom chord at a radial location midway between its top chords and web members respectively interconnecting said top chords to each other and to said bottom chord, said web members being respectively in radial alignment with the top chords of said radially extending arched trusses, and radially disposed bottom web members aligned respectively with the bottom chords of said trusses and interconnecting the respective bottom chords of the said annular trusses.

7. A space frame dome as defined in claim 1 in which said radial trusses include inverted tripod supports at their outer ends, said supports respectively comprising rigidly outwardly converging extensions of the respective chords of each truss, and means coupling the converging ends of said extensions to the tension ring at uniformly circumferentially spaced intervals, whereby to provide between said supports a circular series of ventilating openings around the outer periphery of the dome, said compression ring defining an elevated central ventilating opening for cooperation with said peripheral openings to produce a convection flow of ventilating air through the dome.

8. A space frame dome as defined in claim 7 which includes a saucer cupola supported by said compression ring above the central ventilating opening therethrough, said cupola defining a weatherproof covering over the said opening.

9. A space frame dome as defined in claim 1 in which the respective radial trusses are of sufficiently lightweight construction as to permit substantial vertical sagging of the medial portion of each truss when the same is supported only at its radial extremities and disassociated from other trusses, and in which said mid portions of the respective trusses, when in their assembled relationship, are urged into circumferentially abutting and mutually supporting relation with adjoining trusses by said sagging tendency.

10. A radial truss for a space frame dome comprising a bottom chord extending generally laterally in a given vertical plane, a pair of top chords symmetrically disposed on opposite sides of said given vertical plane and converging laterally toward said plane, top web members fixedly interconnecting said top chords in their said converging relation, and side web members of uniform length interconnecting each said top chord to said bottom chord in uniformly spaced relation throughout substantially the lengths of said chords, the relative lateral convergency of said top chords toward each other in said one direction causing a corresponding vertical divergency in said direction of the bottom chords away from the common level of said top chords, whereby to achieve an increased depth of the truss in said direction, together with an increasingly vertical disposition of the side web members in said direction, whereby to provide increased load supporting strength of said truss toward its converging end.

11. An elongated vertically arched truss for use in fabrication of a compoundly curved dome, said truss being symmetrical to a vertical plane extending lengthwise thereof and comprising a pair of similarly vertically arched top chords on opposite sides of said plane, said top chords converging in a given lengthwise direction toward said plane, top webs extending laterally across said plane between and at substantially the level of said interconnected chords, a bottom vertically arched chord extending in said plane substantially below the respective top chords, side webs fixedly interconnecting each said top chord to said bottom chord in uniformly spaced relation throughout the lengths of said converging top chords, said bottom chord diverging from the common level of said top chords in said given lengthwise direction, whereby said truss is caused to taper laterally in said given lenghtwise direction while tapering vertically in an opposite lengthwise direction.

12. An elongated vertically arched truss as defined in claim 11 in which said side webs comprise a plurality of diagonal elongated brace members of uniform length extending in alternate diagonal directions between each said top chord and the bottom chord.

13. A vertically arched truss as defined in claim 12 in which said diagonal braces are caused to approach increasingly toward positions in vertical planes in said given lengthwise direction, whereby to impart increasing ability to withstand vertical stresses in said direction.

14. A space frame dome comprising relatively concentric radially spaced tension and compression rings, a plurality of radially continuous arched trusses each extending radially between and connected to the respective tension and compression rings in radially thrusting engagement therewith, each of said radial trusses comprising a pair of relatively inwardly converging continuous top chords extending radially to the said dome, said top chords of each truss being contiguous with and interconnected to the top chords of relatively adjoining trusses, top web members interconnecting the top chords of each said truss at uniform radial intervals coincident with the panel joints of each truss, and cooperating with the said top chords to define a plurality of generally rectangular frames of uniform radial extent for supporting similarly shaped sheets of material, said top chords, with their respective top web members being adapted to cooperate with such sheets of material to define a continuous dome outer surface, each said truss being of triangular configuration in cross section and including a radially extending bottom chord in a vertical plane bisecting the radial angle between its top chords, a plurality of alternately oppositely inclined diagonal brace members rigidly connecting each of said top chords to said bottom chord and defining the side web members of the respective trusses, said brace members being connected to each top chord at uniform radial intervals coincident with the respective panel joints and top web members, and converging downwardly in pairs from each top chord for connection of their converging ends to the bottom chord of their respective truss at uniformly radially spaced locations in all of the trusses midway between the respective panel joints and top web members, said pairs of downwardly converging brace members of all the trusses thus being uniformly radially positioned, with the downwardly converging ends of adjoining trusses disposed in a multiplicity of circular series concentrically to the said inner and outer rings, and a plurality of relatively concentric and continuous circular tie rods respectively supported on and interconnected to the respective bottom chords, said circular tie rods extending between and being radially located by the converging lower ends of said diagonal braces of the respective circular series.

15. A space frame dome comprising relatively concentric radially spaced tension and compression rings, a plurality of radially continuous arched trusses, each extending radially between and connected to the respective tension and compression rings, in radially thrusting engagement therewith, each of said radial trusses comprising a pair of relatively inwardly converging top chords extending radially to the said dome, said top chords of each truss being contiguous with and interconnected to the top chords of relatively adjoining trusses, top web members interconnecting the top chords of each said truss at uniform radial intervals coincident with the panel joints of each truss, and cooperating with the said top chords to define a plurality of generally rectangular frames of uniform radial extent for supporting rectangularly shaped sheets of material, said top chords, with their respective top web members being adapted to cooperate with such sheets of material to define a continuous generally hemispherical dome outer surface, and a plurality of relatively concentric and continuous circular tie rods respectively supported by and rigidly interconnecting all of said radially continuous arched trusses.

16. A space frame dome comprising relatively concentric radially spaced rings, a plurality of trusses extending radially between and connected to the respective rings, each said truss being of triangular configuration in cross section and including a pair of radially disposed top chords converging at an angle toward each other, a radially extending bottom chord in a vertical plane bisecting the angle between its top chords, a plurality of alternately oppositely inclined diagonal brace members rigidly connecting each of said top chords to said bottom chord and defining the side web members of the respective trusses, said brace members converging downwardly in pairs from each top chord for connection of their converging ends to the bottom chord of their respective truss at uniform radial locations in all of the trusses, and a plurality of relatively concentric and continuous circular tie rods respectively supported on and interconnected to the respective bottom chords, said circular tie rods extending between and being radially located by the converging lower ends of said diagonal braces.

17. A space frame dome as defined in claim 16, in which said dome is in the shape of an inverted catenoid, while each of the said trusses is formed as a catenary curve corresponding in shape to a radial cross section of said catenoid dome, the curvature configuration of said dome being formed as required to withstand the dead and maximum vertical live loading of the said dome, whereby to subject said top and bottom chord members to compressive forces which are equal in all of said chords at corresponding radial locations therealong, and in which the amount of variation of said compressive force throughout substantially the entire length of each chord is of such extremely small magnitude as to permit the use of chords of uniform cross-sectional size and shape throughout their respective lengths.

18. A space frame dome as defined in claim 16, in which said dome is in the form of an inverted catenoid, while the said trusses are curved in conformity with the surface of said catenoid, whereby said trusses and the chords thereof are subjected to pure and substantially equal compression and are free of stress reversals and bending moments, and wherein said diagonal brace members are substantially free of stress.

19. A space frame dome as defined in claim 18, in which the bottom chord of each truss is connected by said diagonal brace members in equidistant relation to each of the top chords throughout its length and diverges downwardly and radially inwardly away from the dome surface midway between said top chords whereby to increase the depth of the truss toward the center of the dome, each said radial trusses being in contiguous relationship with the trusses on either side thereof, whereby the said trusses afford mutual lateral bracing, the said normally unstressed condition of the diagonal web members, together with the increasing depth of the respective trusses toward the center of the dome, and the said mutual lateral bracing action of the contiguous trusses providing ample reserve strength to enable the dome to withstand unusual loads such as caused by snow and high winds.

20. A space frame dome comprising a pair of relatively-concentric radially and vertically-spaced rigid rings of relatively-different diameters, the smaller diameter said ring being spaced above the larger diameter said ring, a plurality of curved trusses extending in radial planes between and connected to the respective rings, said dome being in the shape of an inverted catenoid, each of said trusses having a catenary curvature corresponding to a radial cross section of said dome; each said truss comprising relatively-spaced upper chords, means rigidly interconnecting said upper chords, and a lower chord also extending in a radial plane below the said upper chords; each said truss being radially coextensive and contiguous with the relatively-adjoining trusses and fixedly connecting thereto at radially-spaced intervals along its upper chords throughout the lengths of said trusses, whereby said trusses mutually reinforce each other against bending forces and said upper chords jointly define the outer configuration of said dome, and a plurality of continuous circular tie rods concentric with said rings respectively supported by and connected to said upper chords at radial intervals along each truss to thus reinforce the respective trusses against torsional forces as well as against bending forces, said trusses being thus interconnected to adjoining trusses at sufficiently-close radial intervals as to permit each truss to withstand a substantial compressive force without bending.

References Cited

UNITED STATES PATENTS 2,690,185   9/1954   Pomykala _____ 52—80

OTHER REFERENCES

Architectural Record, April 1956, pages 220, 221.

JOHN E. MURTAGH, *Primary Examiner.*